(12) United States Patent
Pavlov

(10) Patent No.: US 12,467,960 B2
(45) Date of Patent: Nov. 11, 2025

(54) CIRCUITS AND METHODS FOR SHUNT RESISTANCE MEASUREMENT

(71) Applicant: Allegro MicroSystems, LLC, Manchester, NH (US)

(72) Inventor: Emil Pavlov, Heidelberg (DE)

(73) Assignee: ALLEGRO MICROSYSTEMS, LLC, Manchester, NH (US)

( * ) Notice: Subject to any disclaimer, the term of this patent is extended or adjusted under 35 U.S.C. 154(b) by 168 days.

(21) Appl. No.: 18/494,135

(22) Filed: Oct. 25, 2023

(65) Prior Publication Data

US 2025/0138069 A1    May 1, 2025

(51) Int. Cl.
G01R 27/16    (2006.01)

(52) U.S. Cl.
CPC ..................... G01R 27/16 (2013.01)

(58) Field of Classification Search
CPC ................ G01R 27/16; G01R 1/203
USPC ....................................... 324/713
See application file for complete search history.

(56) References Cited

U.S. PATENT DOCUMENTS

| | | | | |
|---|---|---|---|---|
| 4,806,848 A * | 2/1989 | Demers | ................ | G01B 7/14 324/683 |
| 6,433,978 B1 * | 8/2002 | Neiger | ................ | H02H 1/0015 324/520 |
| 7,075,287 B1 | 7/2006 | Mangtani et al. | | |
| 7,219,022 B2 | 5/2007 | Wekhande | | |
| 8,896,330 B2 * | 11/2014 | Barnes | ................ | G01R 27/16 340/568.1 |
| 9,829,534 B2 * | 11/2017 | Bakran | ................ | G01R 31/27 |
| 10,312,847 B2 | 6/2019 | Lu | | |
| 10,348,223 B1 | 7/2019 | Khosravi et al. | | |
| 10,784,810 B1 | 9/2020 | Lu | | |
| 10,819,257 B1 | 10/2020 | Khosravi et al. | | |
| 10,873,280 B2 | 12/2020 | Lu et al. | | |
| 11,387,756 B1 | 7/2022 | Khosravi et al. | | |
| 11,555,832 B2 | 1/2023 | Friedrich et al. | | |
| 11,621,657 B1 | 4/2023 | Foletto et al. | | |
| 11,658,597 B1 | 5/2023 | Babushkin et al. | | |
| 2016/0291059 A1 * | 10/2016 | Ausserlechner | ....... | G01R 1/203 |
| 2019/0339304 A1 * | 11/2019 | Panine | ................ | G01R 19/0092 |
| 2020/0041546 A1 * | 2/2020 | Liberty | ................ | G01R 15/09 |

(Continued)

FOREIGN PATENT DOCUMENTS

CN    109342807 B  *  8/2021  ............. G01R 19/25

OTHER PUBLICATIONS

U.S. Appl. No. 18/173,236, filed Feb. 23, 2023, Korol, et al.

*Primary Examiner* — Judy Nguyen
*Assistant Examiner* — Robert P Alejnikov, Jr.
(74) *Attorney, Agent, or Firm* — DALY, CROWLEY, MOFFORD & DURKEE, LLP

(57) ABSTRACT

Apparatus and methods for measuring a shunt resistance through which an input current flows, wherein the input current has a first frequency range, include a voltage source configured to generate an AC voltage having a second frequency range that is higher than the first frequency range. An inductor, a capacitor, and the shunt resistance form an RLC network to which the voltage source is coupled. Processing circuitry coupled to receive a superimposed voltage across the shunt resistance is configured to generate a measured resistance indicative of the shunt resistance in response to the superimposed voltage.

18 Claims, 5 Drawing Sheets

(56) References Cited

U.S. PATENT DOCUMENTS

2020/0295682 A1     9/2020   Lu
2025/0102550 A1*   3/2025   Kawahara .............. G01R 27/08

* cited by examiner

CIRCUITS AND METHODS FOR SHUNT RESISTANCE MEASUREMENT

BACKGROUND

Systems that use a shunt resistor for current measurement are known in a variety of applications. Typically, the input current is sensed by measuring a voltage drop across the shunt resistor in order to thereby determine the level of current flow through the shunt resistor based on the measured voltage drop and known resistance of the shunt resistor.

Shunt resistance current measurement can be susceptible to error based on the tolerance of the shunt resistance. The nominal shunt resistance can vary, for example, due to process variations, thereby degrading the resulting current measurement.

Schemes for addressing current measurement error due to error in the shunt resistance include the use of precision resistors and calibration of the resistance after circuit assembly. However, precision resistors tend to be expensive components and calibration circuitry and processes to trim the resistance error can add complexity and can increase manufacturing time.

Other causes of shunt resistance variations can be more challenging to address, such as resistance changes due to temperature, as may be attributable to ambient temperature changes and/or self-heating by the input current, and also resistance drift over time. One way to address temperature-based resistance variations is to use specially designed materials for the shunt resistor. However, self-heating resistance variations and lifetime changes of the resistance can be more difficult to compensate.

SUMMARY

The present disclosure is directed to circuits and methods for measuring a shunt resistance using a resonant circuit, as may include the shunt resistance along with an inductor and capacitor. Methodologies include applying an AC voltage to the resonant circuit at a different frequency than the frequency of an input current to be measured and processing a superimposed voltage across the shunt resistance to generate a measured resistance indicative of the shunt resistance. Such a measured resistance can be used to determine the input current. In this way, variations in the resistance of the shunt resistor can be compensated so as not to adversely affect the accuracy of the input current measurement and such compensation can be achieved simultaneously with the input current measurement.

According to the disclosure, apparatus for measuring a shunt resistance through which an input current flows includes a voltage source configured to generate an AC voltage, an inductor, a capacitor, wherein the inductor, capacitor, and shunt resistance form an RLC network and wherein the voltage source is coupled to the RLC network. The input current has a first frequency range and the AC voltage has a second frequency range that is higher than the first frequency range. Processing circuitry coupled to receive a superimposed voltage across the shunt resistance is configured to generate a measured resistance indicative of the shunt resistance in response to the superimposed voltage.

Features may include one or more of the following individually or in combination with other features. The superimposed voltage can include a first voltage component based on the input current and a second voltage component based on the AC voltage. The processing circuitry includes a high pass filter configured to extract the second voltage component. The processing circuitry further includes an amplifier and an ADC to generate the second voltage component. The second frequency can be a fixed frequency. The processing circuitry can include a processor configured to generate the measured resistance by:

$$RLm = \frac{V_{rm}(t)(x_L - x_c)}{\sqrt{V_{in}^2(t) - V_{rm}^2(t)}}$$

wherein $V_{rm}(t)$ is the second voltage component of the superimposed voltage, $x_L$ is the impedance of the inductor, $x_c$ is the impedance of the capacitor, and $V_{in}(t)$ is the AC voltage. The second frequency can be a variable frequency configured to be swept over a frequency range. The processing circuitry can include a waveshape processor configured to generate the measured resistance. The waveshape processor can be configured to measure the second voltage component at a fixed frequency. The waveshape processor can be configured to measure the second voltage component for a plurality of frequencies to determine a waveshape and to fit the determined waveshape to a plurality of known waveshapes, each associated with a different shunt resistance in order to generate the measured resistance. The processing circuitry can include a low pass filter configured to extract the first voltage component. The processing circuitry can be further configured to compute the input current based on the measured resistance and the first voltage component.

Also described is a method for measuring a shunt resistance through which an input current flows. The method includes providing an RLC network including an inductor, a capacitor, and the shunt resistance, and applying an AC voltage to the RLC network. The input current has a first frequency range and the AC voltage has a second frequency range that is higher than the first frequency range. A superimposed voltage across the shunt resistance is measured and includes a first voltage component based on the input current and a second voltage component based on the AC voltage. A measured resistance indicative of the shunt resistance is determined in response to the superimposed voltage.

Features may include one or more of the following individually or in combination with other features. Determining the measured resistance can include extracting the second voltage component with a high pass filter. Applying the AC voltage to the RLC network can include applying an AC voltage having a second, fixed frequency. Determining the measured resistance can further include computing the measured resistance by:

$$RLm = \frac{V_{rm}(t)(x_L - x_c)}{\sqrt{V_{in}^2(t) - V_{rm}^2(t)}}$$

wherein $V_{rm}(t)$ is the second voltage component of the superimposed voltage, $x_L$ is the impedance of the inductor, $x_c$ is the impedance of the capacitor, and $V_{in}(t)$ is the AC voltage. Applying the AC voltage to the RLC network can include applying an AC voltage having a second, variable frequency. Determining the measured resistance further can include measuring the second voltage component at a fixed frequency. Determining the measured resistance can further include determining a waveshape of the second voltage component by measuring the second voltage component for a plurality of frequencies and fitting the determined waveshape to a plurality of known waveshapes, each associated with a different shunt resistance. The method can further include computing the input current based on the measured resistance and the first voltage component.

BRIEF DESCRIPTION OF DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Figure 1:
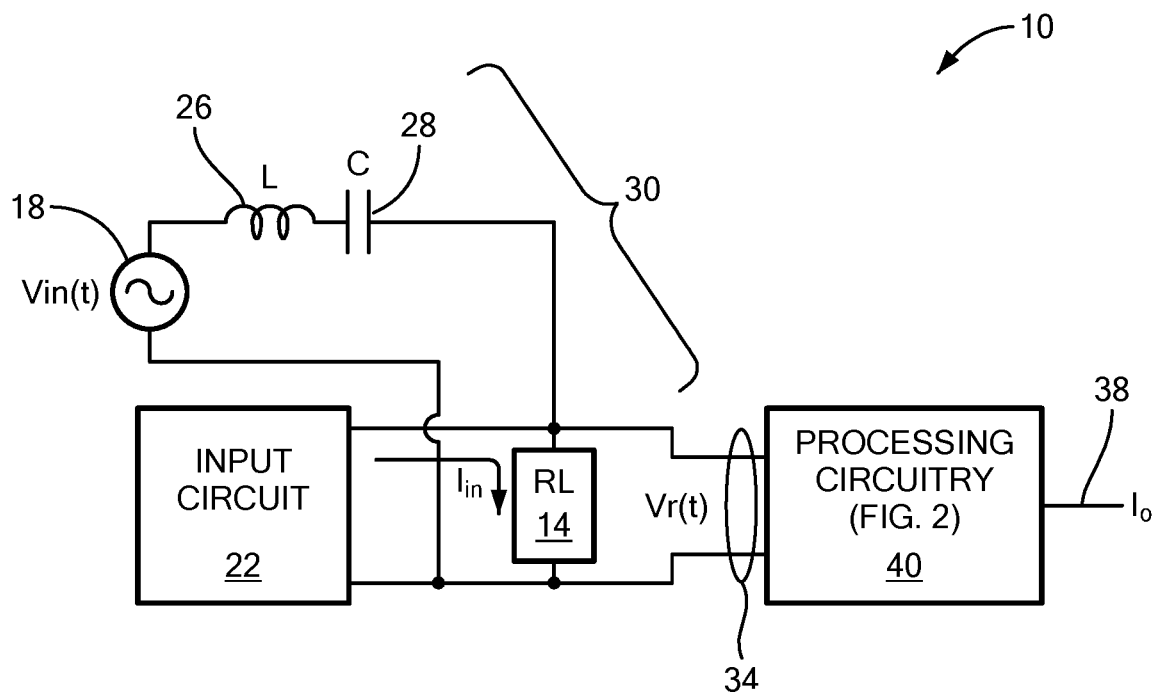
FIG. 1 is a simplified diagram of a circuit for measuring a shunt resistance.

According to the disclosure, a circuit 10 for measuring a resistance RL of a shunt resistor 14 includes a voltage source 18 configured to generate an AC voltage Vin(t) that is applied to a resonant circuit 30 including the shunt resistor 14. The resonant circuit 30 can be an RLC network including an inductor 26, a capacitor 28, and the shunt resistor 14. It will be appreciated by those of ordinary skill in the art that although the illustrated RLC network 30 is formed by a series coupling of the resistor 14, inductor 26, and capacitor 28, other arrangements are possible. For example, the RLC components can be coupled in parallel or can be coupled partially in series and partially in parallel.

Processing circuitry 40 is coupled to receive a superimposed voltage Vr(t) 34 measured across the shunt resistor 14 and generates a measured resistance signal or value or simply measured resistance RLm indicative of the resistance RL of shunt resistor 14.

In operation, an input current Iin generated by an input circuit 22 flows through the shunt resistor 14. The superimposed voltage Vr(t) 34 includes a first voltage component Vim(t) based on the input current Iin and a second voltage component Vrm(t) based on the AC voltage Vin(t).

The input current Iin has a first frequency, or frequency range and the AC voltage Vin(t) from voltage source 18 has a second frequency, or frequency range that is higher than the first frequency, or frequency range. By separating the frequency of the AC voltage Vin(t) from the frequency of the input current Iin, the component of the superimposed voltage Vr(t) 34 attributable to the AC voltage Vin(t) and the component of the superimposed voltage Vr(t) 34 attributable to the input current Iin can be distinguished from each other and thus separated for further processing. This arrangement advantageously permits simultaneous determination of the input current and the shunt resistance.

In an example embodiment, the first frequency of the input current Iin can be on the order of less than 100 KHz and the second frequency of the AC voltage source 18 can be tuned to be outside of the bandwidth of the input current. By way of one non-limiting example, the first frequency of the input current Iin can be 20 KHz and the second frequency of the AC voltage source 18 can be 3 MHz.

In general, the second frequency is selected to be close to the resonant frequency of the RLC network 30. In an example in which the second frequency is 3 MHz, inductor 26 can have an inductance of 4.0 $\mu$H and capacitor 28 can have a capacitance of 0.7 nF. Proximity of the second frequency to the resonant frequency of the RLC circuit 30 yields a larger voltage component Vrm(t), as can be advantageous for noise immunity reasons.

Processing circuitry 40 is further configured to determine the level of the input current Iin. More particularly, the level of the input current Iin is computed based on the measured shunt resistance RLm. An output signal Io 38 is indicative of the computed input current Iin.

Figure 2:
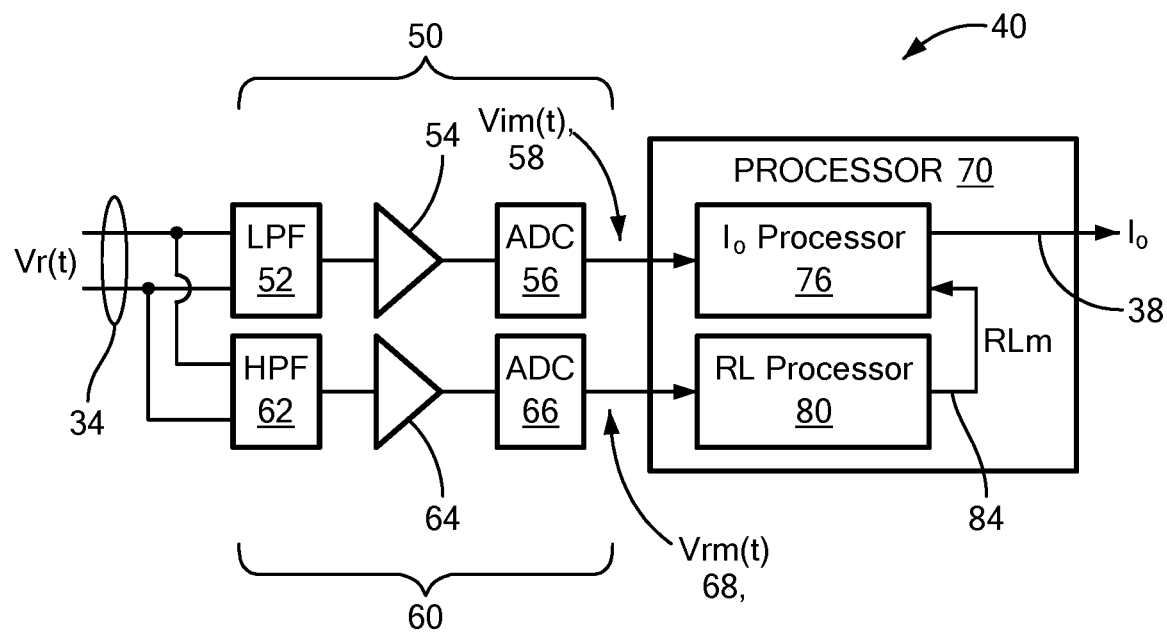
FIG. 2 is a simplified diagram of the processing circuitry of FIG. 1.

Referring also to FIG. 2, example processing circuitry 40 is coupled to receive the superimposed voltage Vr(t) 34 across shunt resistor 14 (FIG. 1) and is configured to generate measured resistance signal RLm 84 indicative of the resistance RL of shunt resistor 14 and to generate output signal Io 38 indicative of the input current Iin to be measured (FIG. 1).

A first signal path 50 and a second signal path 60 receive the superimposed voltage Vr(t) and separate the composite signal into its constituent parts, including the first component Vim(t) 58 based on the input current Iin and the second component Vrm(t) 68 based on the AC voltage Vin(t).

First circuit path 50 includes a low pass filter 52 to extract the first voltage component Vim(t) 58 that is attributable to the input current Iin. Example circuit path 50 additionally includes an amplifier 54 and an analog-to-digital converter (ADC) 56. It will be appreciated by those of ordinary skill in the art that the order of elements 52, 54, and 56 can be varied and also that additional or fewer processing elements can be used in order to generate the first voltage component Vim(t) 58 that is based on the input current Iin.

Second circuit path 60 includes a high pass filter 62 to extract the second voltage component Vrm(t) 68 that is attributable to the AC voltage Vin(t). Example circuit path 60 additionally includes an amplifier 64 and an analog-to-digital converter (ADC) 66. It will be appreciated by those of ordinary skill in the art that the order of elements 62, 64, and 66 can be varied and also that additional or fewer processing elements can be used in order to generate the second voltage component Vrm(t) 68 that is based on the AC voltage Vin(t).

A processor 70 can include an RL processor 80 configured to compute the shunt resistance RLm 84 and an Jo processor 76 configured to compute the input current Iin and generate the output signal Jo 38. It will be appreciated by those of ordinary skill in the art that in embodiments, processors 76 and 80 may be separate processors or components of a single processor 70.

Figure 3:
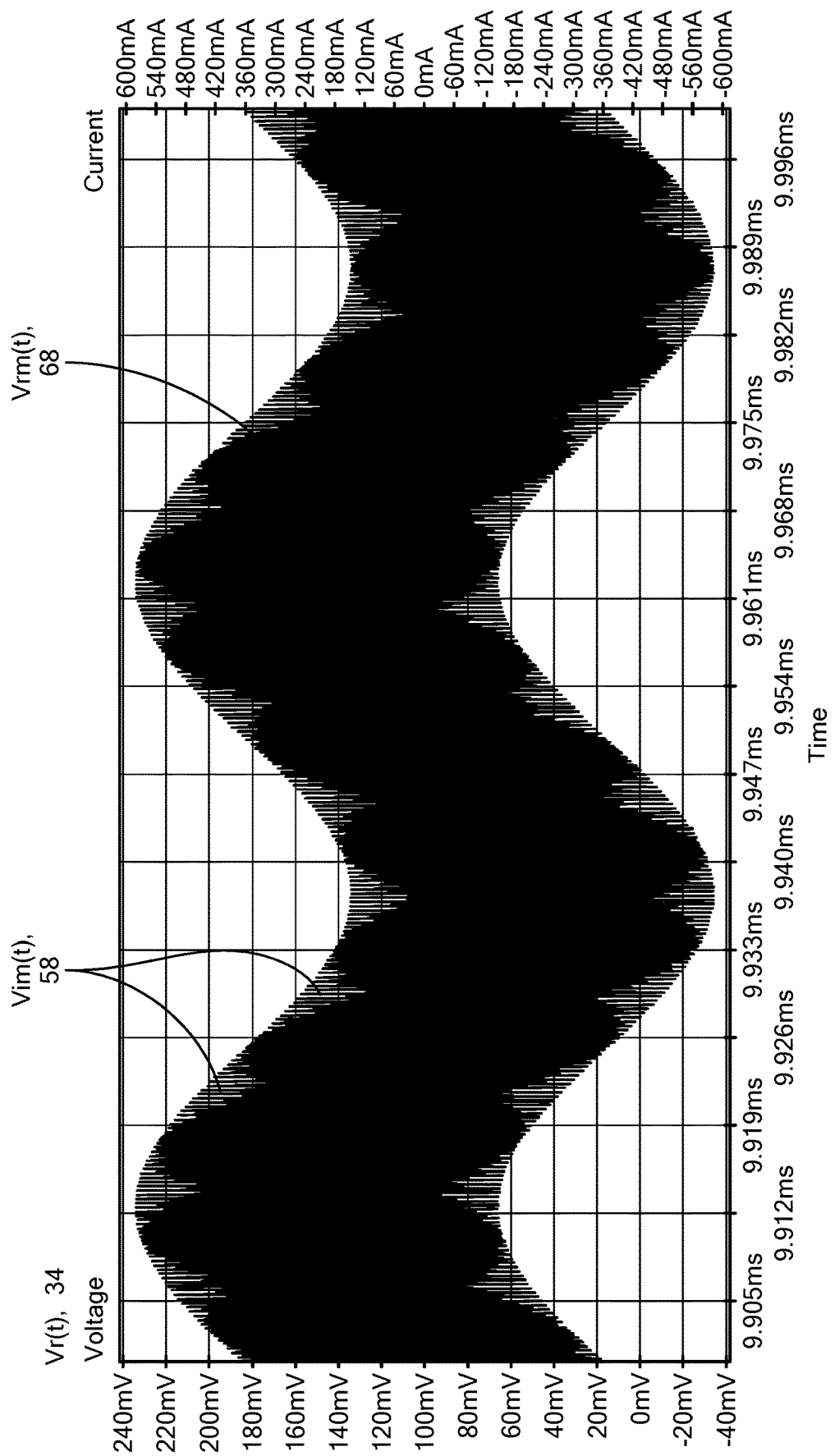
FIG. 3 shows an example superimposed voltage waveform measured across the shunt resistance and that includes a first voltage component based on the input current and a second voltage component based on an applied AC voltage.

Referring to FIG. 3, an example superimposed voltage Vr(t) 34 is shown with the superimposed voltage along the left vertical axis in units of millivolts, the input current Iin along the right vertical axis in units of milliamps, and time along the horizontal axis in units of milliseconds. The superimposed voltage Vr(t) 34 includes the first voltage component Vim(t) 58 based on the input current Iin and second voltage component Vrm(t) 68 based on the AC voltage Vin(t). As is apparent, the first voltage component Vim(t) 58 having a lower frequency and the second voltage component Vrm(t) 68 having a higher frequency can be readily distinguished from each other.

Figure 3A:
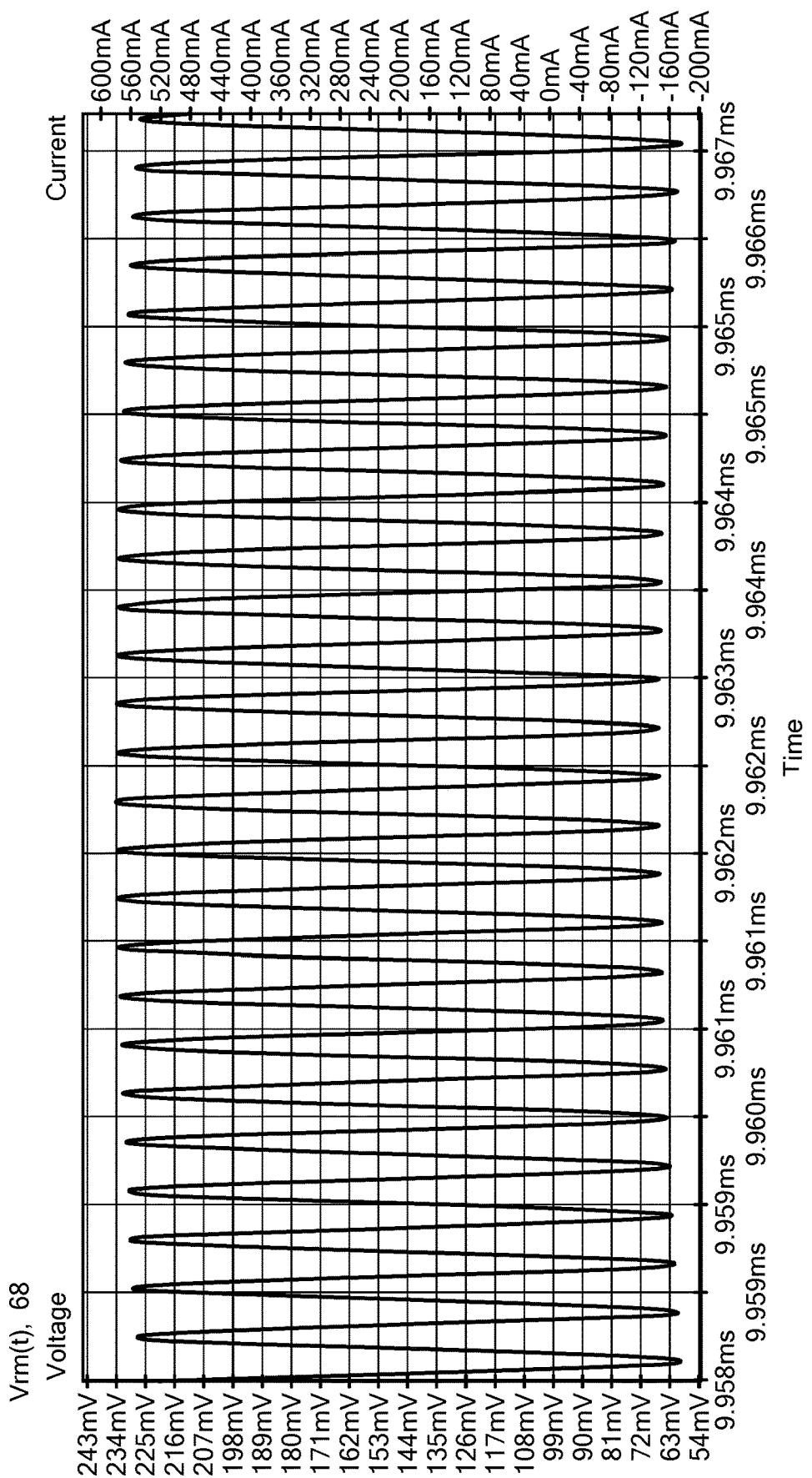
FIG. 3A shows an example of the second voltage component of the superimposed voltage of FIG. 3 over time.

FIG. 3A illustrates the second voltage component Vrm(t) 68 of the example superimposed voltage Vr(t) 34 of FIG. 3, with the voltage component 68 along the left vertical axis in units of millivolts, the input current Iin along the right vertical axis in units of milliamps, and time along the horizontal axis in units of milliseconds.

The resonant frequency $\omega_0$ of the RLC network 30 can be given by:

$$\omega_0 = \frac{1}{\sqrt{LC}} \tag{1}$$

where L is the inductance of inductor 26 and C is the capacitance of capacitor 28.

The voltage across the shunt resistor 14 attributable to the AC input voltage Vin(t) (i.e., voltage component Vrm(t) 68) can be expressed as:

$$Vrm(t) = \frac{RLm V_{in}(t)}{\sqrt{RLm^2 + \left(\omega L - \frac{1}{\omega C}\right)^2}} \tag{2}$$

where L is the inductance of inductor 26, C is the capacitance of capacitor 28, $V_{in}(t)$ is the AC voltage of source 18, and RLm 84 is the resistance of shunt resistor 14.

Solving equation (2) for the shunt resistance RLm 84 provides the following:

$$RLm = \frac{V_{rm}(t)(x_L - x_c)}{\sqrt{V_{in}^2(t) - V_{rm}^2(t)}} \tag{3}$$

where $V_{rm}(t)$ is the voltage component 68 attributable to the AC input voltage Vin(t), $x_L$ is the impedance of inductor 26, $x_c$ is the impedance of capacitor 28, and $V_{in}(t)$ is the AC voltage of source 18.

It will be appreciated by those of ordinary skill in the art that in embodiments in which the RLC network 30 takes a different form than the illustrated series-coupled elements 14, 26, and 28, the equation for the measured shunt resistance RLm will differ from equation (3) accordingly.

In some embodiments, the frequency of the AC voltage source 18 is fixed. In this case, the measured shunt resistance RLm 84 can be computed by the RL processor 80 according to equation (3) above.

In some embodiments, the frequency of the AC voltage source 18 can be varied, or swept around the resonant frequency $\omega_0$, in which case RL processor 80 can operate to fit the signal shape or parameters of the second voltage component Vrm(t) 68 to stored waveshapes or parameters, as explained further below in connection with FIG. 4.

Figure 4:
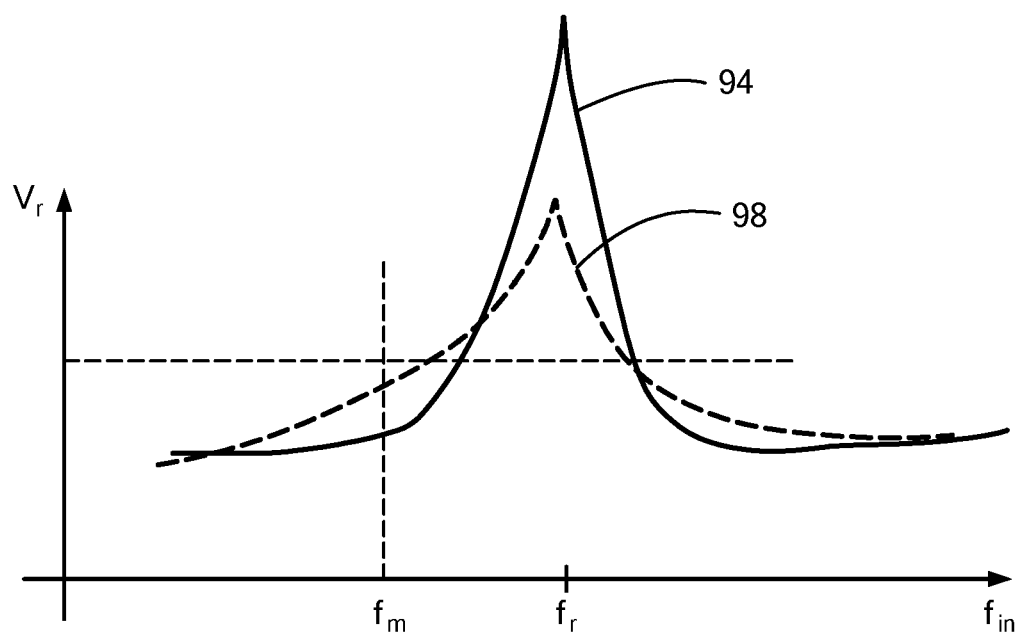
FIG. 4 shows example waveforms associated with the second voltage component of the superimposed voltage of FIG. 3 over frequency.

Referring also to FIG. 4, waveforms 94, 98 illustrate example second voltage components Vrm 68 over frequency of the input voltage Vin from source 18 for different example shunt resistance values. In other words, the voltage component Vrm(t) 68 can have different example waveshapes 94, 98, depending on the resistance value of the shunt resistor 14. For example, a higher shunt resistance value RLm will yield a higher peak voltage at the resonant frequency, $f_r$, as illustrated by waveform 94 and a lower shunt resistance value RLm will yield a lower peak voltage at the resonant frequency, $f_r$, as illustrated by waveform 98.

Waveshapes and/or waveform parameters such as peak voltage of voltage component 68 for different shunt resistance values RLm can be stored in a memory. In other words, the analytical form of the shunt resistance given by equation (2) for the illustrated RLC network 30 can be used to generate different waveshapes and waveform parameters corresponding to different shunt resistance values to be stored in memory.

Having swept the frequency $f_{in}$ of the input voltage Vin(t) from source 18, various methodologies can be used to determine the shunt resistance value RLm 84. In some embodiments, the measured resistance RLm 84 can be determined by measuring the second voltage component 68 at a predetermined frequency, $f_m$, and the voltage thus measured can be compared to stored voltages at the predetermined frequency in order to determine the shunt resistance value 84. In other words, a look-up table stored in memory can contain a plurality of measured voltages 68 for different frequencies of input voltage Vin, with each stored measured voltage having a corresponding stored resistance value 84. It will be appreciated that the closer to the resonant frequency $f_r$ of the network 30 is to the predetermined frequency $f_m$, the larger the variation in measured voltages for different shunt resistance values.

Alternatively, the second voltage component can be measured for a plurality of frequencies and the waveshape thus acquired can be compared to stored waveshapes for different shunt resistances. Stated differently, by measuring the voltage 68 for different sets of frequencies, the resulting waveshape can be fit or matched to a plurality of stored waveshapes for different shunt resistance values. In this example, a look-up table stored in memory can contain a plurality of waveshapes 94, 98 over a set of frequencies of input voltage Vin, with each stored waveshape having a corresponding stored resistance value 84.

Figure 5:
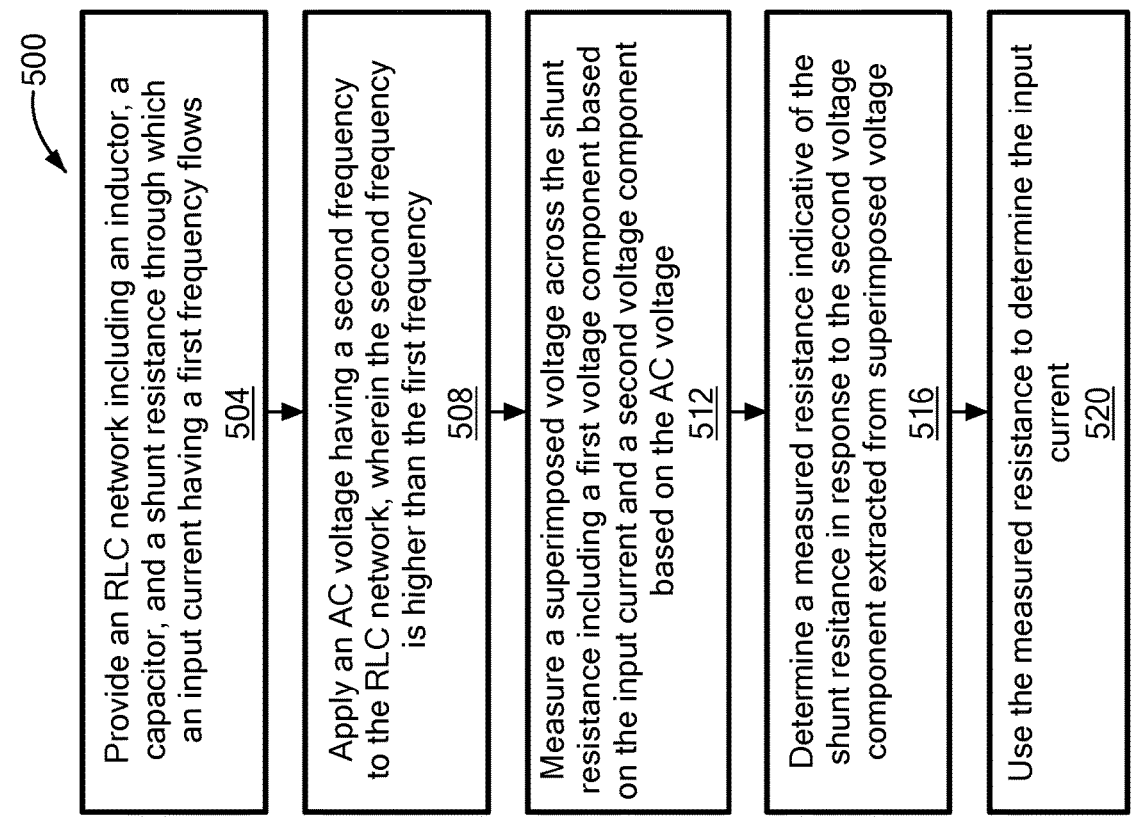
FIG. 5 is a flow diagram illustrating a methodology for determining the shunt resistance and input current.

Referring also to FIG. 5, a flow diagram illustrating methods according to the disclosure commences with providing a resonant network at block 504. For example, the resonant network can be the same as or similar to the RLC network 30 of FIG. 1 that includes shunt resistor 14 coupled to receive an input current Iin to be measured. The input current Iin can have a first frequency range.

At block 508, an AC voltage having a second frequency range is applied to the resonant network. The second frequency range can be higher than the first frequency range.

A superimposed voltage Vr(t) 34 across the shunt resistor 14 can be measured at block 512. The superimposed voltage 34 has a first component Vim(t) 58 based on the input current Iin and a second component Vrm(t) 68 based on the AC voltage. The first and second voltage components 58, 68 can be extracted from the superimposed voltage 34 by various circuitry and methods, such as shown in FIG. 2 for example.

At block 516, a measured resistance RLm is determined. The measured resistance RLm is indicative of the shunt resistance RL 14 and can be determined as explained above in connection with the RL processor 80 based computation according to equation (3) above for example.

Having determined the shunt resistance value RLm 84 at block 516, the Jo processor 76 uses the computed shunt resistance RLm 84 to compute the input current Jo and generate the current sensor output signal Jo 38 at block 520. More particularly, the input current level Iin can be determined by dividing the measured and extracted first voltage component Vim(t) 58 by the computed shunt resistance RLm.

With the described arrangements, the present disclosure provides circuits and methods for measuring a shunt resistance using a resonant circuit that includes the shunt resistance. Methodologies include applying an AC voltage having a different frequency than the frequency of an input current to be measured and processing a superimposed voltage across the shunt resistance to generate a measured resistance indicative of the shunt resistance. In this way, variations in the resistance of the shunt resistor compensated so as not to adversely affect the accuracy of the input current measurement and such compensation is achieved simultaneously with the input current measurement.

Figure 6:
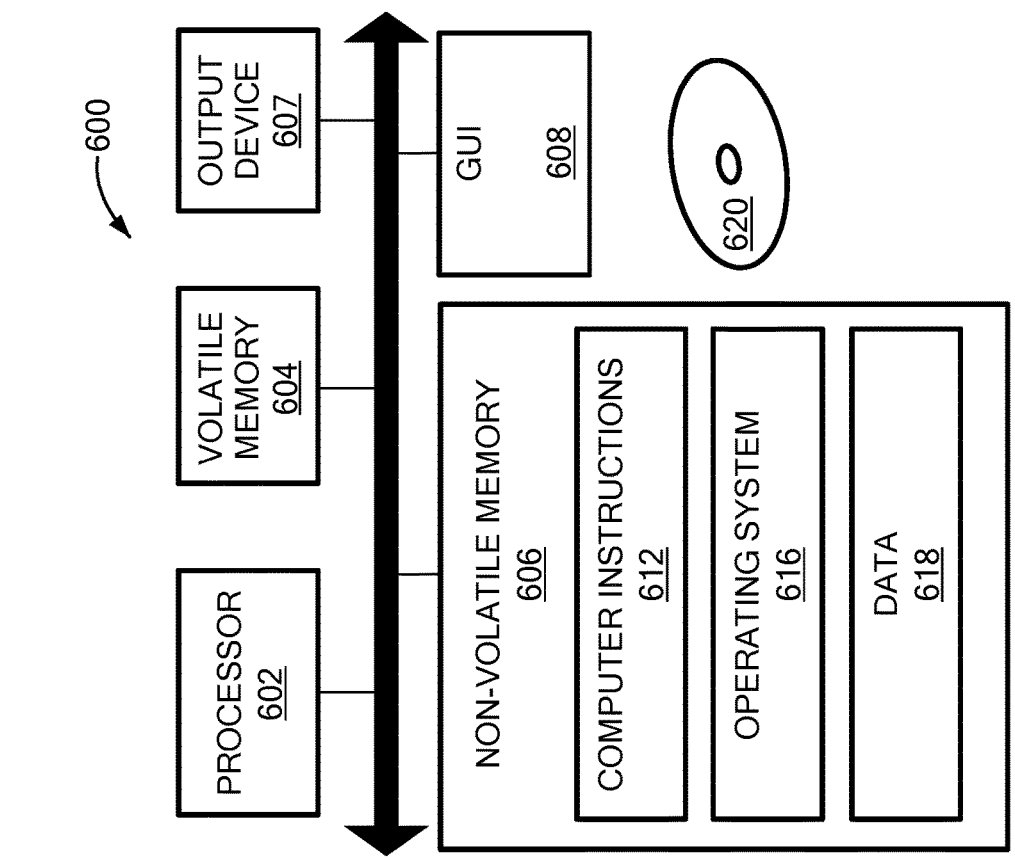
FIG. 6 is a block diagram of an example computer system operative to perform processing, in accordance with the present disclosure.

FIG. 6 is a block diagram of an example computer system 600 operative to perform processing, in accordance with the present disclosure. Computer system 600 can perform all or at least a portion of the processing, e.g., steps in the algorithms and methods, described herein. The computer system 600 includes a processor 602, a volatile memory 604, a non-volatile memory 606 (e.g., hard disk, EEPROM, OTP memory, etc.), an output device 607 and a user input or interface (UI) 608, e.g., graphical user interface (GUI), a mouse, a keyboard, a display, and/or any common user interface, etc. The non-volatile memory (non-transitory storage medium) 606 stores computer instructions 612 (a.k.a., machine-readable instructions or computer-readable instructions) such as software (computer program product), an operating system 616 and data 618. In some examples, the computer instructions 612 are executed by the processor 602 out of (from) volatile memory 604. In one embodiment, article 620 (e.g., a storage device or medium such as a hard disk, an optical disc, magnetic storage tape, optical storage tape, flash drive, etc.) includes or stores the non-transitory computer-readable instructions.

As used herein, the terms "processor" and "controller" are used to describe elements that perform a function, an operation, or a sequence of operations. The function, operation, or sequence of operations can be hard coded into an electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory, in a discrete electronic circuit which can be analog or digital, and/or in special purpose logic circuitry (e.g., a field programmable gate array (FPGA)). Processing can be implemented in hardware, software, or a combination of the two. Processing can be implemented using computer programs executed on programmable computers/machines that include one or more processors, a storage medium or other article of manufacture that is readable by the processor (including volatile and non-volatile memory and/or storage elements), at least one input device and one or more output devices. Program code can be applied to data entered using an input device to perform processing and to generate output information. A processor or controller can contain internal processors or modules that perform portions of the function, operation, or sequence of operations. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, that includes a list of elements is not necessarily limited to only those elements but can include other elements not expressly listed or inherent to such apparatus, method, composition, mixture, or article.

References in the specification to "embodiments," "one embodiment," "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that the scope of the patent should not be limited to the described implementations but rather should be limited only by the spirit and scope of the following claims.

What is claimed is:

1. Apparatus for measuring a shunt resistance through which an input current flows, wherein the input current has a first frequency range, comprising:
   a voltage source configured to generate an AC voltage having a second frequency range that is higher than the first frequency range;
   an inductor;
   a capacitor, wherein the inductor, capacitor, and shunt resistance form an RLC network and wherein the voltage source is coupled to the RLC network; and
   processing circuitry coupled to receive a superimposed voltage across the shunt resistance and configured to generate a measured resistance indicative of the shunt resistance in response to the superimposed voltage,
   wherein the superimposed voltage comprises a first voltage component based on the input current and a second voltage component based on the AC voltage.

2. The apparatus of claim 1 wherein the processing circuitry comprises a high pass filter configured to extract the second voltage component.

3. The apparatus of claim 2 wherein the processing circuitry further comprises an amplifier and an ADC to generate the second voltage component.

4. The apparatus of claim 1 wherein the second frequency is a fixed frequency.

5. The apparatus of claim 4 wherein the processing circuitry comprises a processor configured to generate the measured resistance by:

$$RLm = \frac{V_{rm}(t)(x_L - x_c)}{\sqrt{V_{in}^2(t) - V_{rm}^2(t)}}$$

wherein $V_{rm}(t)$ is the second voltage component of the superimposed voltage, $x_L$ is the impedance of the inductor, $x_c$ is the impedance of the capacitor, and $V_{in}(t)$ is the AC voltage.

6. The apparatus of claim 1 wherein the second frequency is a variable frequency configured to be swept over a frequency range.

7. The apparatus of claim 6 wherein the processing circuitry comprises a waveshape processor configured to generate the measured resistance.

8. The apparatus of claim 7 wherein the waveshape processor is configured to measure the second voltage component at a fixed frequency.

9. The apparatus of claim 7 wherein the waveshape processor is configured to measure the second voltage component for a plurality of frequencies to determine a waveshape and to fit the determined waveshape to a plurality of known waveshapes, each associated with a different shunt resistance in order to generate the measured resistance.

10. The apparatus of claim 1 wherein the processing circuitry comprises a low pass filter configured to extract the first voltage component.

11. The apparatus of claim 10 wherein the processing circuitry is further configured to compute the input current based on the measured resistance and the first voltage component.

12. A method for measuring a shunt resistance through which an input current flows, wherein the input current has a first frequency range, the method comprising:
   providing an RLC network comprising an inductor, a capacitor, and the shunt resistance;
   applying an AC voltage having a second frequency range to the RLC network, wherein the second frequency range is higher than the first frequency range;
   measuring a superimposed voltage across the shunt resistance comprising a first voltage component based on the input current and a second voltage component based on the AC voltage; and
   determining a measured resistance indicative of the shunt resistance in response to the superimposed voltage,
   wherein determining the measured resistance comprises extracting the second voltage component with a high pass filter.

13. The method of claim 12 wherein applying the AC voltage to the RLC network comprises applying an AC voltage having a second, fixed frequency.

14. The method of claim 12 wherein applying the AC voltage to the RLC network comprises applying an AC voltage having a second, variable frequency.

15. The method of claim 12 further comprising computing the input current based on the measured resistance and the first voltage component.

16. A method for measuring a shunt resistance through which an input current flows, wherein the input current has a first frequency range, the method comprising:
   providing an RLC network comprising an inductor, a capacitor, and the shunt resistance;
   applying an AC voltage having a second frequency range to the RLC network, wherein the second frequency range is higher than the first frequency range;
   measuring a superimposed voltage across the shunt resistance comprising a first voltage component based on the input current and a second voltage component based on the AC voltage; and
   determining a measured resistance indicative of the shunt resistance in response to the superimposed voltage,
   wherein applying the AC voltage to the RLC network comprises applying an AC voltage having a second, fixed frequency,
   wherein determining the measured resistance further comprises computing the measured resistance by:

$$RLm = \frac{V_{rm}(t)(x_L - x_c)}{\sqrt{V_{in}^2(t) - V_{rm}^2(t)}}$$

wherein $V_{rm}(t)$ is the second voltage component of the superimposed voltage, $x_L$ is the impedance of the inductor, $x_c$ is the impedance of the capacitor, and $V_{in}(t)$ is the AC voltage.

17. A method for measuring a shunt resistance through which an input current flows, wherein the input current has a first frequency range, the method comprising:
   providing an RLC network comprising an inductor, a capacitor, and the shunt resistance;
   applying an AC voltage having a second frequency range to the RLC network, wherein the second frequency range is higher than the first frequency range;
   measuring a superimposed voltage across the shunt resistance comprising a first voltage component based on the input current and a second voltage component based on the AC voltage; and
   determining a measured resistance indicative of the shunt resistance in response to the superimposed voltage,
   wherein applying the AC voltage to the RLC network comprises applying an AC voltage having a second, variable frequency, and wherein determining the measured resistance further comprises measuring the second voltage component at a fixed frequency.

18. A method for measuring a shunt resistance through which an input current flows, wherein the input current has a first frequency range, the method comprising:

providing an RLC network comprising an inductor, a capacitor, and the shunt resistance;

applying an AC voltage having a second frequency range to the RLC network, wherein the second frequency range is higher than the first frequency range;

measuring a superimposed voltage across the shunt resistance comprising a first voltage component based on the input current and a second voltage component based on the AC voltage; and determining a measured resistance indicative of the shunt resistance in response to the superimposed voltage, wherein applying the AC voltage to the RLC network comprises applying an AC voltage having a second, variable frequency, and wherein determining the measured resistance further comprises determining a waveshape of the second voltage component by measuring the second voltage component for a plurality of frequencies and fitting the determined waveshape to a plurality of known waveshapes, each associated with a different shunt resistance.

* * * * *